Patented Oct. 30, 1945

2,388,224

UNITED STATES PATENT OFFICE 2,388,224

PURIFICATION OF SUGAR SOLUTIONS

Abraham Sidney Behrman, Chicago, Ill., assignor to Infilco Incorporated, a corporation of Delaware No Drawing. Application November 25, 1941, Serial No. 420,347

7 Claims. (Cl. 127—46)

This invention relates to the purification of sugar solutions or juices and is directed primarily to the purification of solutions of sucrose, such as those of beet sugar, cane sugar and the like.

A principal object of the invention is to improve the efficiency and economy of the method of purifying sucrose solutions by hydrogen exchange treatment followed by acid removal or anion exchange.

Another object of the invention is to decrease the amount of "sweet water" produced in the course of the operation of this method of treatment.

A third object of the invention is to decrease the amount of labor, chemicals, and wash water employed in this type of purification process.

Other objects of the invention will become apparent on the further reading of this specification and the claims.

It has recently been proposed to purify sucrose solutions, such as beet juice, cane juice and the like by subjecting the juice, usually after the customary defecation steps, to a hydrogen exchange treatment followed by acid removal or anion exchange. The principal purpose of this treatment is to remove the ash-forming and other melassigenic constituents of the juice, and thus increase the yield and improve the quality of the crystallizable sugar and correspondingly reduce or even practically eliminate the formation of final molasses. The hydrogen exchange treatment converts the inorganic and organic salts to their corresponding free acids, which are subsequently removed bodily in the acid-removal or anion exchange step. In this way it has been found possible to produce treated juices of such great purity (e. g. purities of 99.0 and slightly higher) that really remarkable improvement has resulted in the ease and completeness of crystallization of the sucrose.

The hydrogen exchange treatment is carried out by subjecting the juice to contact with a hydrogen-exchange substance, such as the "carbonaceous zeolites" now commercially available and which are typically prepared by action of strong sulfuric acid on coal, wood, lignite, or other carbonaceous raw material; and certain synthetic resins have similar properties. The hydrogen-exchange body is regenerated with a strong acid, such as sulfuric or hydrochloric, sulfuric usually being preferred because of its cheapness. Regeneration with acid is followed by washing with water to remove salts and excess acid. When the sugar juice is contacted with the hydrogen-exchange body, the cations in the juice are replaced by hydrogen, thus forming and leaving in the juice the corresponding free acids such as hydrochloric, sulfuric, carbonic and various organic acids.

The juice from the hydrogen-exchange treatment is subsequently subjected to contact with an acid-removal or anion-exchange substance, such as the m-phenylenediamine formaldehyde resin of Adams and Holmes (see U. S. Patent No. 2,151,883 issued March 28, 1939), other synthetic resins of undisclosed composition now commercially available under the trade-names of "Anex" and "Amberlite," or certain metallic oxides. As a result of this treatment the free acids are removed; there is still some uncertainty as to whether this removal is accomplished by direct adsorption of the free acids or by anion exchange between the anions of the free acids and hydroxyl ions from the resin with the formation of water. Merely for convenience in terminology the anion-exchange theory will be assumed in this specification and claims, and the phenomenon of acid removal will be referred to as "anion exchange" without any warranty as to the accuracy of that theory or any limitation because of it. The spent "anion-exchange" body is regenerated with a solution of an alkali, such as sodium hydroxide or carbonate; the equivalent potassium compounds or ammonium hydroxide may also be employed. The regeneration with alkali is followed by washing with water to remove salts and excess alkali.

One of the principal drawbacks of any sucrose purification method of this type is the danger of inversion of the sucrose at the low pH of the treated juice. It is generally considered that a pH of at least 7.0 to 7.5 is necessary to prevent inversion of the sucrose, particularly if the solution is allowed to stand for any great length of time. Obviously, the pH of the sugar juice is reduced considerably below 7.0 (it may be reduced to as low as pH 2.5 in the case of beet sugar "thin juice") as a result of the hydrogen exchange treatment, due to replacement with hydrogen of the cations in the juice; but it has been found that, if the acidic juice after hydrogen exchange is subjected to the anion-exchange treatment with reasonable promptness, no appreciable formation of invert sugar will result.

The first juice coming from the anion-exchange treatment will customarily have a quite high pH—frequently as high as 10 or even higher—due to the difficulty of completely washing out with water the last traces of alkali used in regeneration. This pH will gradually drop as the run progresses.

When the pH of the treated juice leaving the anion exchange body drops down to about 7.0 to 7.5, it has been the practice heretofore to stop the flow of juice and discontinue the run in order to avoid the danger of forming invert sugar; and in some cases, where an appreciable drop in pH was observed when the juice was subsequently boiled, the practice has been to stop the purification run when the pH has dropped only to about 8.5, at which point the juice is slightly alkaline to phenolphthalein indicator.

I have found that this practice of stopping the purification run when the pH of the juice from the anion-exchange treatment ceases to be definitely on the alkaline side (that is, above 7.0) is not only entirely unnecessary but that it actually imposes a severe penalty on the efficiency and economy of the process. Specifically, I have found it possible to continue the run until the pH of the treated juice has not only reached the pH of neutrality (that is, pH 7.0) but has dropped considerably below it and even down as far as about pH 4.3 with no appreciable increase in the amount of ash constituents and with no danger of formation of invert sugar. In this way it is possible to lengthen the purification run, and therefore, the acid-removal capacity of the anion-exchange substance between regenerations, very materially, in some cases as much as 25 or even 50 per cent.

This result is made possible by utilizing my observations that the anion-exchange step of the treatment may be continued until the pH of the treated liquor is well below 7.0, and even down as low as about 4.3, and in some cases substantially lower than 4.3, with substantially complete removal of anions, and that the juice, in this relatively low pH range, which has been subjected to the hydrogen exchange and anion exchange treatments is so completely unbuffered that only a minute amount of an alkali, such as sodium hydroxide or equivalent substance, is necessary to raise the pH of the treated juice to well above the danger point of inversion and without increasing appreciably the ash constituents of the juice.

The increased efficiency and economy resulting from my improved method will be apparent at once to those skilled in the sugar art. The most evident of these advantages is the greater volume of sugar juice treated by a cubic foot of the anion-exchange material. Stemming from this greater treating capacity is lessened frequency of regeneration, with reduced expense for labor, chemicals and wash water.

One of the most important benefits of my improved method is the greatly lessened amount of "sweet water" or dilute sugar juice produced in the process. When the sugar juice being treated is first applied to a freshly regenerated and washed bed of anion-exchange material, it is diluted with the water in the pores of the material and in the void spaces between the particles. Similarly, when a bed of anion-exchange material is exhausted, the pores and void spaces are filled with sugar juice; in displacing this valuable sugar with washing (before regeneration with alkali) more "sweet water" is formed. The disposal of this "sweet water" produced in the "sweetening on" and "sweetening off" operations is a very serious problem. As much of it is re-used in the manufacturing process as is possible. Any excess must be evaporated; and this excess may reach such formidable proportions as not only to overload the boiling capacity of the sugar mill but to make the cost of evaporation prohibitively expensive. Since the amount of "sweet water" produced in the ion-exchange process is a direct function of the frequency of regeneration, it follows that increasing the length of a purification run by 25 per cent will decrease the amount of "sweet water" by about 20 per cent, and increasing the length of run by 50 per cent will decrease the "sweet water" by about 33 per cent; and the practicability of the process may well be determined by reductions in "sweet water" much less than those just mentioned.

The amount of alkali applied to the juice after the anion-exchange treatment will vary with the nature of the juice, the desired resultant pH, and on other special and practical operating considerations. Thus, for example, in the refining of "raw" cane sugar to make the purified white sugar of commerce, the nature and small amount of the impurities in the syrup to be purified makes it possible to secure the desired elevation of pH with extremely small quantities of alkali. An almost completely unbuffered liquor of this sort may have, after the anion-exchange treatment may have, for example, at a pH of about 6.0 a titratable alkalinity (to methyl orange indicator) of about 5 milligrams calcium carbonate equivalent per liter; at a pH of about 5.0, an alkalinity of about 3 milligrams per liter; and at a pH of about 4.4, an alkalinity of zero. If it is desired to raise the pH of the liquor in these three cases to about pH 8.3, chosen here for its convenience as being the point of first appearance of color with phenolphthalein indicator, the desired increase in pH may be secured by the addition, respectively, of about 2.6, 3.9 and 6.5 milligrams of sodium hydroxide per liter of the liquor; and the increase in ash content (expressed in terms of calcium carbonate) resulting from these additions will be respectively only about 3, 5 and 7 milligrams per liter, in all three cases the increase in ash being less than 0.01 per cent if the sugar content of the liquor is assumed to be 10 per cent, and proportionately small if the sugar content is greater. It is also possible in some cases to effect a very appreciable overall net reduction in ash content by raising with alkali the pH of the end of the run liquor even when the run is continued after it has dropped substantially below 4.3. In one instance, for example, when the pH of the effluent from anion-exchange treatment was allowed to drop to 3.6, only 9 milligrams sodium hydroxide per liter was required to increase the pH to 8.3, with an increased ash content of about 12 milligrams per liter; and when the pH of the effluent was allowed to drop still further to about 3.3, only 22 milligrams sodium hydroxide per liter was required to increase the pH to 8.3, with an increased ash content of about 27 milligrams per liter. Practical operating considerations will usually determine the minimum pH of the effluent from the anion-exchange treatment at which that treatment will be interrupted and the anion-exchange material regenerated.

In cases where the sugar juice to be treated contains considerable quantities of carbonates or bicarbonates, as is typically true of the "thin juice" in beet sugar manufacture, so that the treated juice will contain appreciable quantities of dissolved free carbon dioxide, it will generally be found desirable to remove the carbon dioxide more or less completely by aeration or other means and thus reduce the amount of alkali required to raise the pH of the juice from the anion-exchange treatment to the desired safe value. The reduced amount of alkali (e. g. sodium hydroxide) added to effect the desired elevation in pH will naturally bring about a correspondingly lower increase in ash constituents resulting from the alkali addition. Removal of the carbon dioxide, as by aeration, is accomplished more readily on the juice from the hydrogen-exchange treatment (because of its very low pH at that point, but more safely, from the inversion standpoint, on the juice after the anion-exchange treatment. Free carbon dioxide will also appear in the juice after anion-exchange treatment if sodium (or potassium carbonate or bicarbonate was used instead of the hydroxide for regenerating the anion-exchange body; and in this case also it is desirable to remove free carbon dioxide from the treated juice before adding alkali to increase the pH to the desired value.

From the foregoing it will be apparent that my improved process comprises the new step of adding to the sugar juice or solution at some suitable point in the process subsequent to the anion-exchange treatment, and after the treated solution has become of undesirably low pH, the small amount of alkaline substance required to raise the pH above the inversion danger point, this improvement being based upon my discovery that by so doing the several advantages above referred to may be had, and are obtained at a very small cost and with negligible increase in ash constituents. There is also comprised the new step of removing carbon dioxide or other volatile acidic substance by aeration or other means whereby the pH may be increased without any increase of ash and the amount of alkali required for raising the pH to a given value may be reduced. It is evident that the alkali used to elevate the pH of the juice after anion-exchange treatment need not be added as such; any equivalent alkaline substance, such as the proper proportion of alkaline sugar liquor from other steps in the manufacturing process, may be utilized.

These and other modifications of my invention are contemplated as being within its scope as defined and limited in the claims.

I claim:

1. In the purification of an impure sucrose solution by hydrogen-exchange treatment and subsequently by anion-exchange treatment, the improvement which comprises continuing the anion exchange treatment of the solution until the pH of the treated solution drops substantially below the value considered necessary to prevent inversion of the sucrose, and subsequently increasing the pH of the treated solution to a value considered sufficiently high to prevent inversion by the addition to said solution of the proper amount of an alkaline substance.

2. In the purification of an impure sucrose solution by hydrogen-exchange treatment and subsequently by anion-exchange treatment, the improvement which comprises continuing the anion-exchange treatment of the solution until the pH of the treated solution falls substantially below 7.0 and subsequently adding an amount of an alkaline substance sufficient to increase the pH of the so treated solution to a value at least as high as 7.0.

3. In the purification of an impure sucrose solution by hydrogen-exchange treatment and subsequently by anion-exchange treatment, the improvement which comprises continuing the anion-exchange treatment of the solution until the pH of the last portion of treated solution is between 7.0 and about 4.3, and subsequently adding an amount of an alkaline substance sufficient to increase the pH of the treated solution to a value at least as high as 7.0.

4. In the purification of an impure sucrose solution by hydrogen-exchange treatment and subsequently by anion-exchange treatment, the improvement which comprises continuing the anion-exchange treatment of the solution until the pH of the treated solution is substantially less than 7.0, removing at least a substantial portion of any free carbon dioxide dissolved in the treated solution, and increasing the pH of that portion of the treated solution which has a pH of less than 7.0 to a value at least as high as 7.0 by the addition of an alkaline substance.

5. An improvement in the purification of an impure sucrose solution according to claim 4, in which free carbon dioxide is removed from the treated solution by aeration.

6. A process for the purification of an impure sucrose solution which comprises subjecting the solution to a hydrogen-exchange treatment and subsequently to anion-exchange treatment, continuing the anion-exchange step on successive portions of solution until the pH of the last portion of treated solution is between 7.0 and about 4.3, aerating the so-treated solution to remove at least a substantial portion of any free carbon dioxide dissolved, and subsequently adding an amount of alkali to said aerated solution sufficient to increase the pH of the treated solution to a value at least as high as 7.0.

7. In the purification of an impure sucrose solution by hydrogen exchange treatment and subsequently by anion exchange treatment, the improvement which comprises continuing the anion exchange treatment of the solution until the normal pH of the effluent from the anion exchange treatment is between 4.3 and 7.0, aerating the so treated solution to remove carbon dioxide, and subsequently adding an amount of sodium hydroxide to said aerated solution sufficient to increase the pH of the treated solution to about 8.5.

ABRAHAM SIDNEY BEHRMAN.

CERTIFICATE OF CORRECTION.

Patent No. 2,388,224. October 30, 1945.

ABRAHAM SIDNEY BEHRMAN.

It is hereby certified that error appears in the printed specification of the above numbered patent requiring correction as follows: Page 2, second column, line 45, for "small" read --smaller--; page 3, first column, line 14, after the word "potassium" insert a closing parenthesis; and that the said Letters Patent should be read with this correction therein that the same may conform to the record of the case in the Patent Office.

Signed and sealed this 5th day of February, A. D. 1946.

Leslie Frazer (Seal)        First Assistant Commissioner of Patents.